United States Patent Office 3,812,125
Patented May 21, 1974

3,812,125
3-DIAZINYL-4-(3-SECONDARY AMINO-2-HYDROXYPROPOXY)-1,2,5-THIADIAZOLES
Burton Kendall Wasson, Valois, Quebec, Canada, assignor to Charles E. Frosst & Co., Kirkland, Quebec, Canada
No Drawing. Application Apr. 21, 1969, Ser. No. 818,090, now Patent No. 3,655,663, which is a continuation-in-part of abandoned application Ser. No. 731,333, May 22, 1968. Divided and this application Sept. 9, 1971, Ser. No. 179,146
Int. Cl. C07d 51/70
U.S. Cl. 260—268 H
4 Claims

ABSTRACT OF THE DISCLOSURE

4-[3-(substituted amino) - 2 - hydroxypropoxy]-1,2,5-thiadiazole compounds, substituted by an N-containing heterocyclic group in the 3-position of the thiadiazole nucleus which exhibit β-adrenergic blocking properties and thus are useful in the management of angina pectoris are described. The products are prepared by one of three principal methods (1) reaction of a 4-hydroxy-1,2,5-thiadiazole with epihalohydrin to provide 4-(3-halo-2-hydroxypropoxy)-1,2,5-thiadiazole which, upon treatment with alkali, forms the epoxide which is then reacted with an amine to provide the desired product; (2) reaction of a 3-chloro (or bromo)-4-(3-substituted amino-2-hydroxypropoxy)-1,2,5-thiadiazole with an N-containing heterocycle that replaces the 3-chloro group; (3) reductive alkylation of an

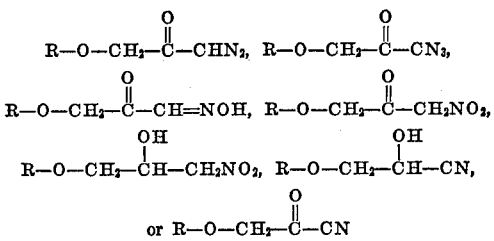

wherein R is the 1,2,5-thiadiazole-4-yl group.

This application is a division of my copending U.S. patent application, Ser. No. 818,090, filed Apr. 21, 1969, now Pat. No. 3,655,663, issued Apr. 11, 1972 which in turn was a continuation-in-part of U.S. Ser. No. 731,333, filed May 22, 1968 (now abandoned).

This invention is concerned with 4-[3-(substituted amino)-2-hydroxypropoxy]-1,2,5 - thiadiazole compounds which are substituted in the 3-position of the thiadiazole nucleus by an N-containing heterocyclic group. These compounds exhibit β-adrenergic blocking properties and have the marked advantages of having a long duration of action and being effective at very low dosage levels.

The novel β-adrenergic blocking agents of this invention have the structure

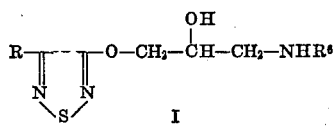

and pharmacologically acceptable salts thereof, wherein R represents an amino having the structure —NR$^7$R$^8$ wherein R$^7$ and R$^8$ are alkyl and joined through nitrogen to form a 5 or 6-membered ring advantageously a hexahydropyrimidyl, piperazinyl and the like groups optionally substituted by lower alkyl C$_{1-3}$; R$^6$ represents (1) a straight or branched chain alkyl having from 1 up to about 20 carbons but preferably a branched chain alkyl having from 3 to 6 carbons such as isopropyl, tert-butyl, 2,2-dimethylpropyl and the like, (2) an unsaturated straight or branched chain alkyl as the alkenyl or alkinyl groups having preferably from 2 to 6 carbons, such as allyl, butynyl, propargyl and the like, said straight or branched chained, saturated or unsaturated alkyl optionally being substituted with one or more groups preferably selected from (a) hydroxy, (b) halogen especially chloro and bromo, (c) carboxyl or lower alkyl (C$_{1-3}$) ester thereof, (d) lower alkoxy or alkylthio where the alkyl moiety is straight or branched chain and contains from 1 to 4 carbons, (e) di-lower alkyl (C$_{1-3}$) amino wherein the alkyl groups optionally can be joined together either directly or through a nitrogen atom to form a heterocyclic group especially from pyrrolidinyl, piperazinyl, piperidinyl, or thiazinyl group, each —N< group preferably being attached to an alkyl moiety having 1 to 8 carbons, (f) phenyl or phenoxy optionally substituted with from one to three similar or dissimilar groups selected from alkoxy (C$_{1-3}$), halogen (preferably chloro) or hydroxy, or (4) a cycloalkyl group having from 3 to 6 nuclear carbons, optionally lower alkyl (C$_{1-3}$) substituted such as the cyclopropyl, cyclopentyl, cyclohexyl, 2-methylcyclohexyl and the like.

Suitable pharmacologically acceptable salts of product I are acid addition salts derived from inorganic acids, for example, hydrochlorides, hydrobromides, phosphates or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylene-bis(2-hydroxy-3-naphthoate) and the like.

The novel 4-[3-(substituted amino) - 2 - hydroxypropoxy]-1,2,5-thiadiazole compounds, structure I, as well as their intermediates which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O,O-di-p-toluoyl tartaric, O,O-dibenzoyl tartaric acids, or other acids conventionally employed for this purpose. Those novel products and intermediate compounds that contain two or more asymmetric carbons in the propylene chain will be obtained as diastereoisomers, and each diastereoisomer, of course, also will be obtained as a racemic compound which can be separated into its optically active isomers by known methods such as described above. Resolution of certain representative intermediate and end products will be described in the detailed examples. All products can be similarly resolved and the claims will be understood to embrace the products in the form of racemic compounds or diastereoisomers as well as in the form of the optically active isomers where appropriate.

While all of the compounds embraced by the above definition possess β-adrenergic blocking properties of the type discussed above, the products having structure I wherein R$^6$ is a branched chain alkyl having 3 to 6 carbons preferably saturated and either unsubstituted or having a hydroxy or alkoxy substituent attached to the alkyl moiety as well as the branched chain lower alkynyl groups have been found to exhibit β-adrenergic blocking properties to a marked degree.

The potential of a product as a β-adrenergic blocking agent conventionally is evaluated by the protocol which was employed to assess the β-blocking properties of the thiadiazole compounds of this invention. The protocol employed comprises intravenous administration of graded doses of the selected compound to rats which are then challenged with a standard dose of isoproterenol, a product known to be a β-stimulant. The $ED_{50}$ for representative products of this invention tested according to this protocol is included in certain of the examples that follow.

The clinical application of β-adrenergic blocking agents are well known to physicians. One use for the novel products of this invention, which constitutes the best mode for use of the products known to applicant at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a short-acting or long-acting agent is needed, such as in the management of angina pectoris.

The products can be prepared in pharmaceutical formulations suitable for oral or parenteral administration preferably in the form of tablets, solutions, suspensions and emulsions. The 1,2,5-thiadiazoles can be formulated in the form of the free base or in the form of their salts in conjunction or admixture with organic and/or inorganic solid or liquid pharmaceutical excipients. No special problems are involved in preparing suitable formulations of these products and methods generally employed for this purpose, which are known to those skilled in this art, are entirely suitable. If desired the compounds can be administered along with or formulated together with other active ingredients. Dosage units of from about 2 mg. to 10 mg. can be provided for the symptomatic adjustment of dosage by the physician depending upon the age and condition of the patient.

The novel thiadiazole products I of this invention can be prepared by one or more of the following routes:

ROUTE I

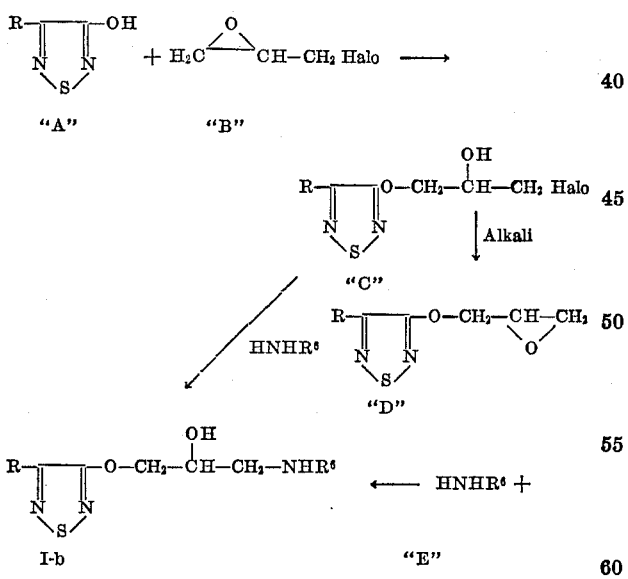

The 3-R-4-hydroxy-1,2,5-thiadiazole (A) is treated with epichlorhydrin or epibromhydrin (B) to provide product "C" which can be separated from the reaction mixture by extraction with ether. Ideally, the epihalohydrin is used in excess for its solvent properties and the reaction proceeds at room temperature or with heating up to about 90° C. with optimum results being obtained by heating at a temperature between about 55–70° C. The reaction of "A" and "B" is additionally facilitated by the presence of a trace of base which serves as a catalyst, preferred catalysts being piperidine, piperidine hydrochloride, pyridine or other heterocyclic bases. After extraction the intermediate product "C" is shaken with aqueous alkali to afford the epoxide (D). Aqueous sodium or potassium hydroxide are preferred at a concentration of about 20% for best yields. Treatment of the epoxide "D" with the amine "E" provides the desired thiadiazole product I–B. Advantageously an excess of the amine is employed for its solvent properties; from 3 to 5 moles of the amine being adequate to give very good yields of the desired product. Larger quantities of course can be employed if so desired. This step can be carried out at a temperature between about ambient temperature and 90° C. although it is preferred to use temperatures between about 60–70° C. It has also been found that certain amines, particularly branched chain monoalkyl amines, as neopentylamine, can be refluxed with the intermediate product "C" to give the desired product I–b directly.

Many of the thiadiazole starting materials, "A," are known compounds or can be made from known starting materials. In general, the process for making the thiadiazoles "A" comprises the reaction of an

R—ClCH—CONH$_2$ with ammonium hydroxide to provide the corresponding α-R-α-amino-acetamide hydrochloride which product, when reacted with $SCl_2$, $S_2Cl_2$, $SOCl_2$ or thionylaniline, provides the desired thiadiazole "A." It is sometimes more convenient to prepare the α-aminoacetamide product from an α-amino acid such as R—CH(NH$_2$)—CO$_2$H by treatment with acetyl chloride in methanol to form the ester which upon treatment with a large excess of ammonium hydroxide forms the desired α-amino-acetamide which then can be treated with $SCl_2$, $S_2Cl_2$, $SOCl_2$ or thionylaniline to provide the thiadiazole "A."

Another route by which novel compounds of this invention can be prepared can be illustrated as follows:

ROUTE II

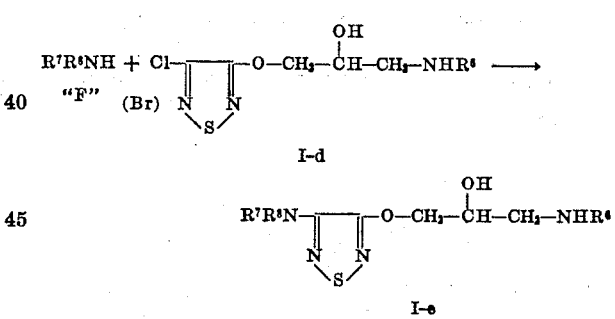

In the second route, treatment of the thiadiazole, I–d (prepared by the method described in Route I) with an amine, "F," affords the appropriately 3-substituted product I–e. When the amine "F" is a heterocycle of the type defined hereinabove the reaction readily takes place without pressure by heating the reactants at a temperature between about 100–150° C. but preferably at a temperature between about 125–135° C. A slight excess of the amine "F" generally is used for its solvent properties and from about 3 to 5 moles of amine have been found to give optimum yields. Larger quantities can, of course be employed, if desired.

Various modifications can be made in the above preferred methods for preparing the products of this invention. For example, when starting material "A" in Route I is the 3-chloro(or bromo)-4-hydroxy-1,2,5-thiadiazole, it can be reacted with product "F" (see Route II) thereby introducing the desired —NR$^7$R$^8$ group in the 3-position of the thiadiazole nucleus. Also, when R in product "D" (see Route I) is chloro or bromo, product "D" can be reacted with the amine "F" whereupon the amine will first react with the epoxide portion of the product and then, by increasing the temperature, it will replace the chloro or bromo group thereby forming a product of the structure:

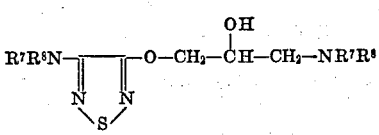

As is usual, the amine is employed in excess for its solvent properties and the second state of the reaction advantageously is carried out at a temperature from between about 110–150° C. although preferably at between about 125–135° C. to introduce the amino group into the 3-position. In some instances it may be advantageous to carry out this reaction in a sealed vessel.

A third route for preparing the novel products of this invention comprises forming the substituted amino group *in situ* by reductive alkylation illustrated by the following scheme:

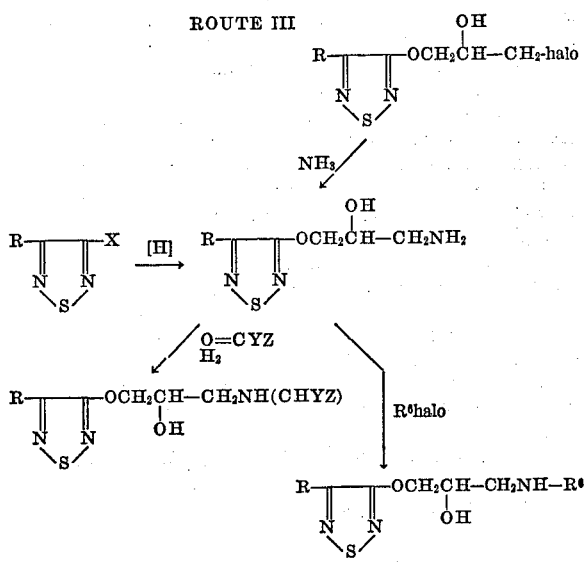

X is

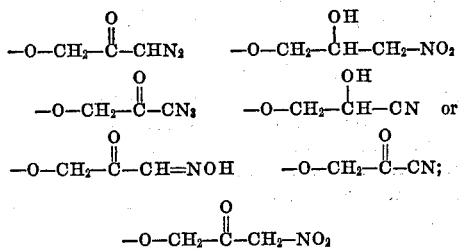

Y is preferably a saturated or unsaturated lower alkyl ($C_{1-5}$), hydroxy-lower alkyl ($C_{2-5}$), lower cycloalkyl ($C_{3-6}$) or phenyl;

Z is lower alkyl ($C_{1-5}$), and when

Y and Z are each lower alkyl they can linked together to form a 3- or 6-membered carbocyclic ring with the carbon to which they are attached;

R has the meaning hereinbefore assigned.

As catalyst, palladium on charcoal or lithium aluminum hydride as reducing agent, advantageously is employed.

The following examples will illustrate representative products of this invention prepared by the above described procedures. It will be understood that these compounds can be prepared by either Route I or Route II or a combination or modification of these routes as described above although the 3-carbamoyl compounds preferably are prepared by Route III. The following examples therefore are not to be considered as limiting the preparation of any particular compound to the method described in the example as the examples are provided solely to illustrate the best modes currently known to applicant for the preparation of the novel thiadiazoles of this invention.

EXAMPLE 1

3-chloro-4-(3-*tert*-butylamino-2-hydroxypropoxy)-1,2,5-thiadiazole

Step A: Preparation of 3-chloro-4-(2,3-epoxypropoxy)-1,2,5-thiadiazole.—A mixture of 30 g. (0.22 moles) of 3-chloro-4-hydroxy-1,2,5-thiadiazole, 71 g. (0.77 moles) of epichlorohydrin, and 0.6 ml. of piperidine is maintained at 65–70° C. for two hours. Excess epichlorohydrin is removed at about 95° C. using water-pump vacuum. The residual viscous gum, 55.5 g., is dissolved in diethyl ether and refrigerated. The supernatant ethereal liquor is drawn off and evaporated to dryness giving 20.2 g. of a viscous oil that is then stirred for about one-half hour with 150 ml. of 10% sodium hydroxide solution. The mixture warms up slightly during this treatment. The mixture then is extracted with diethyl ether, washed with water, and evaporated to yield 20.2 g. of crude 3-chloro-4-(2,3-epoxypropoxy)-1,2,5-thiadiazole.

Step B: Preparation of 3 - chloro - 4 - (3-*tert*-butylamino - 2 - hydroxypropoxy) - 1,2,5 - thiadiazole hydrochloride.—A mixture of 40.2 g. (0.21 mole) of 3-chloro-4-(2,3 - epoxypropoxy) - 1,2,5 - thiadiazole and 76 g. (1.05 moles) of *tert*-butylamine is heated and stirred at 60–70° C. for two and one-half hours. Excess *tert*-butylamine is removed *in vacuo* giving 42.4 g. of residual crude product. The latter is dissolved by shaking with a mixture of diethyl ether and water containing 2.5 g. of sodium hydroxide. The ethereal phase is separated and the aqueous phase is extracted with several portions of diethyl ether. The ethereal extracts are combined, washed with small volumes of water and then treated with excess 3 N hydrochloric acid. The aqueous layer is separated, evaporated to dryness, and the resulting residue is dried by azeotropic distillation of benzene ethanol. The crystalline solid is recrystallized from ethanol diethyl ether giving 31.3 g. (49.5%) of 3-chloro - 4 - (3-*tert*-butylamino - 2 - hydroxypropoxy) - 1,2,5 - thiadiazole hydrochloride, M.P. 159–161° C. Recrystallizations from the same solvent mixture gives product melting at 161–163° C. ($ED_{50}$=0.093 mg./kg.).

*Analysis.*—Calculated for $C_9H_{17}Cl_2N_3O_2S$: C, 35.77; H, 5.67; Cl, 23.46; N, 13.90. Found: C, 36.11; H, 5.37; Cl, 23.33; N, 13.82.

Step C: Preparation of 3-chloro - 4 - (3 - *tert*-butylamino - 2 - hydroxypropoxy) - 1,2,5 - thiadiazole.—The 3-chloro - 4 - (3-*tert*-butylamino - 2 - hydroxypropoxy)-1,2,5 - thiadiazole hydrochloride obtained in Step B is neutralized with aqueous sodium carbonate and the free base extracted with diethyl ether. After removal of the solvent, the residue is recrystallized from di-isopropyl ether giving the free base as colorless prisms, M.P. 78–79° C.

*Analysis.*—Calculated for $C_9H_{16}ClN_3O_2S$: C, 40.66; H, 6.07; Cl, 13.34; N, 15.81; S, 12.07. Found: C, 40.80; H, 6.18; Cl, 13.80; N, 16.00; S, 11.80.

In the following Sections describing methods of resolving certain of the racemic products of this invention, no attempt has been made to assign an absolute configuration to the compounds. The (−)- and (+)-isomers of the resolving agents refer to the optical rotation of the parent (−) or (+) agent employed. All (−) and (+) values given throughout for the compounds refer to the actual rotation of the free base, i.e., in referring to the levorotatory salt, (+)-3-morpholino - 4 - (3-*tert*-butyl-amino-2-hydroxypropoxy) - 1,2,5 - thiadiazole hydrogen maleate, the (+)- sign refers to the sign of rotation of the free base, (+)-3-morpholino - 4 - (3 - *tert*-butyl-amino-2-hydroxypropoxy)-1,2,5-thiadiazole.

RESOLUTION OF EXAMPLE 1 PRODUCT

Section 1

Isolation of (+)-3-chloro - 4 - (3-*tert*-butylamino-2-hydroxypropoxy) - 1,2,5 - thiadiazole via the O,O - di-p-toluoyl-(—)-tartrate Step A: A warmed solution of 26.5 g. (0.1 mole) of racemic 3-chloro - 4 - (3 - *tert*-butylamino - 2 - hydroxypropoxy) - 1,2,5 - thiadiazole from Example 1, Step C, in 100 ml. of ethanol is added to a warmed solution of 38.6 g. (0.1 mole) of O,O-di-p-toluoyl-(—)-tartaric acid in 225 ml. of ethanol and the mixture left overnight at 5° C. The precipitated solid is collected, washed with 25 ml. of ethanol and dried to give 49.8 g. of crystalline product, M.P. 160–2° C. (dec.), ($[\alpha]_D^{22°}$ +77.5°, c.=2.9 in $CH_3OH$)*. The crude salt is recrystallized five times from five volumes by weight of ethanol affording 21.0 g. of enriched (+) - 3 - chloro - 4 - (3-*tert*-butyl-amino-2-hydroxypropoxy) - 1,2,5 - thiadiazole hydrogen O,O-di-p-toluoyl - (—) - tartrate, M.P. 166.5–7.0° C. (dec.), ($[\alpha]_D^{22°}$ +80.6°, c.=2.5 in $CH_3OH$).

Step B: The above salt (21.0 g., 0.0323 mole) is shaken with a mixture of 100 ml. of water, 14 ml. (0.07 mole) of 5 N sodium hydroxide solution, and 100 ml. of diethyl ether. Two further ether extractions (2× 50 ml.) are performed and the combined ethereal extract is extracted once with 30 ml. (ca. 0.04 mole) of 1.38 N hydrochloric acid. The acid layer is extracted once with a small amount of diethyl ether, and then basified with 10 ml. (0.05 mole) of 5 N sodium hydroxide solution. The liberated base is extracted with 100 ml. of diethyl ether, followed by two 25 ml. portions of ether. The ethereal extracts are combined and washed with 20 ml. (2× 10 ml.) of water, dried over anhydrous magnesium sulfate and evaporated to dryness under reduced pressure to give 7.9 g. of syrupy (+) - 3 - chloro - 4 - (3 - *tert*-butylamino-2-hydroxypropoxy) - 1,2,5 - thiadiazole ($[\alpha]_D^{20°}$ +6.5°, c.=2.4 in $CH_3OH$). The syrup (7.9 g.) is dissolved in 115 ml. of warm "Skellysolve B" (essentially, n-hexane, b. 60–68°) the solution allowed to cool to room temperature, seeded with a trace of racemic base, and left 18 hours at room temperature. The crrystalline solids are collected, washed with a small volume of "Skellysolve B," and dried to give 0.92 g. of (±) - 3 - chloro - 4 - (3 - *tert*-butylamino-2-hydroxypropoxy) - 1,2,5 - thiadiazole contaminated with a small amount of the (+)-enantiomer, M.P. 59–68° C. The filtrate afforded 5.6 g. of (+) - 3 - chloro - 4 - (3-*tert*-butylamino - 2 - hydroxypropoxy)-1,2,5-thiadiazole, M.P. 58.5–62.5° C. ($[\alpha]_D^{20°}$ +6.7°, c.=2.5 in $CH_3OH$). Further crystallization of the latter from "Skellysolve B" afforded the product melting at 58.5–60.0° C., ($[\alpha]_D^{20°}$ +7.22°, c.=2.5 in $CH_3OH$), ($ED_{50}$=0.023 mg./kg. tested as HCl salt).

*Analysis.*—Calculated for $C_9H_{16}ClN_3O_2S$: C, 40.68; H, 6.07; Cl, 13.34; N, 15.81; S, 12.06. Found: C, 41.15; H, 6.08; Cl, 13.76; N, 16.13; S, 12.04.

Section 2

Preparation of (+)-3-chloro-4-(3-*tert*-butylamino-2-hydroxypropoxy-1,2,5-thiadiazole hydrochloride A solution of (+)-3-chloro-4-(3-*tert*-butylamino-2-hydroxypropoxyl)-1,2,5-thiadiazole (1.45 g., M.P. 59–60° C.) in 20 ml. of anhydrous diethyl ether is treated with an excess of ethanolic hydrogen chloride solution. The precipitated solid is collected and washed with anhydrous diethyl ether to give 1.43 g. of (+)-3-chloro-4-(3-*tert*-butylamino-2-hydroxypropoxy) - 1,2,5 - thiadiazole hydrochloride, M.P. 148–51° C. Precipitation of this material in ethanol with diethyl ether affords the product with M.P. 148–9.5° C. ($[\alpha]_D^{22°}$ —7.65°, c.=2.75 in $CH_3OH$).

*Analysis.* — Calculated for $C_9H_{16}ClN_3O_2S \cdot HCl$: C, 35.77; H, 5.67; Cl, 23.46; N, 13.90; S, 10.60. Found: C, 35.88; H, 5.74; Cl, 23.61; N, 14.06; S, 10.34.

Section 3

Isolation of (—)-3-chloro-4-(3-*tert*-butylamino-2-hydroxypropoxy)-1,2,5-thiadiazole All liquors and washes resulting from the isolation of (+)-3-chloro-4-(3-*tert* - butylamino-2-hydroxypropoxy)-1,2,5-thiadiazole hydrogen O,O-di-p-toluoyl-(—)-tartrate (see Section 1) are combined, evaporated to dryness, and the residue treated with 5 N sodium hydroxide solution as described in Section 1. The mixture then is extracted three times with diethyl ether. The combined ethereal extracts are washed with water, dried, and evaporated to dryness to give 14.3 g. of enriched (—)-3-chloro-4-(3-*tert*-butyl-amino-2-hydroxypropoxy)-1,2,5-thiadiazole, M.P. 58–76° C. The crude material (14.3 g.) is dissolved in 210 ml. of "Skellysolve B," allowed to cool to room temperature, seeded with a trace of racemic base, and left at room temperature for 24 hours. The crystals are collected and dried to give 5.9 g. of (±)-3-chloro-4-(3-*tert*-butylamino-2-hydroxypropoxy) - 1,2,5 - thiadiazole, M.P. 78.5–9.5° C. ($[\alpha]_D^{20°}$ 0°), and the mother liquors afford further crops of crystalline racemic material. The remaining mother liquors upon evaporation then affords a total of 6.9 g. of (—)-3-chloro-4-(3-*tert* - butylamino-2-hydroxypropoxy)-1,2,5-thiadiazole, M.P. 57–60° C. ($[\alpha]_D^{22°}$ —7.31°, c.=2.5 in $CH_3OH$). Further purification gives (—)-3-chloro-4-(3-*tert*-butylamino - 2 - hydroxypropoxy)-1,2,5-thiadiazole, M.P. 59–60° C. ($ED_{50}$=0.056 mg./kg., tested as hydrochloride salt).

*Analysis.*—Calculated for $C_9H_{16}ClN_3O_2S$: C, 40.68, H, 6.07; Cl, 13.34; N, 15.81; S, 12.06. Found: C, 40.46; H, 6.21; Cl, 13.31; N, 15.96; S, 11.90.

Section 4

Preparation of (—)-3-chloro-4-(3-*tert*-butylamino-2-hydroxypropoxy)-1,2,5-thiadiazole hydrochloride A slight excess of ethanolic hydrogen chloride solution is added slowly to a stirred solution of (—)-3-chloro-4-(3-*tert* - butylamino-2-hydroxypropoxy)-1,2,5-thiadiazole (1.66 g., 6.26 millimoles, M.P. 59–60° C., obtained as in Section 3 in 50 ml. of dry diethyl ether. The resulting precepitated solid is collected, washed with anhydrous diethyl ether, and dried to give 1.8 g. of (—)-3-chloro-4-(3-*tert* - butylamino-2-hydroxypropoxy)-1,2,5-thiadiazole hydrochloride, M.P. 146–7° C. ($[\alpha]_D^{20°}$ +7.9°, c.=2.8 in $CH_3OH$).

Section 5

Isolation of (—)-3-chloro-4-(3-*tert*-butylamino-2-hydroxypropoxy)-1,2,5-thiadiazole Step A: The procedure set forth in Section 1 is repeated with the exception that O,O-di-p-toluoyl-(—)-tartaric acid is replaced by O,O-di-p-toluoyl-(+)-tartaric acid. Thus solutions of 25.75 g. (0.0972 mole) of (±)-3-chloro-4-(3-*tert* - butylamino-2-hydroxypropoxy)-1,2,5-thiadiazole in 100 ml. of anhydrous ethanol and 37.5 g. (0.0972 mole) of O,O-di-p-toluoyl-(+)-tartaric acid in 225 ml. of anhydrous ethanol are mixed and chilled for two hours at 5° C. to give 49.1 g. (77.6%) of the salt, M.P. 159–61° C. The crystalline product is recrystallized five times from anhydrous ethanol to give 24 g. of highly enriched (—)-3-chloro-4-(3-*tert* - butylamino-2-hydroxypropoxy)-1,2,5-thiadiazole hydrogen O,O-di-p-toluoyl-(+)-tartrate, M.P. 165–6° C. ($[\alpha]_D^{22°}$ —80.1°, c.=3 in $CH_3OH$).

---

*The legends employed here and throughout the specification have the following significance. "$[\alpha]_D^{22°}$+77.5" signifies the specific rotation at 22° C. (or other given temperature), at the "D" line of sodium.

"c.=2.9 in $CH_3OH$" signifies the concentration of the product (2.9% or other given concentration) in methanol (or other specified solvent).

9

*Analysis.*—Calculated for $C_9H_{16}ClN_3O_2S \cdot C_{20}H_{18}O_8$: C, 53.3; H, 5.25; Cl, 5.44; N, 6.44; S, 4.91. Found: C, 53.1; H, 4.99; Cl, 5.86; N, 6.94; S, 4.93.

Step B: The procedure set forth in Step B of Section 1, is followed for the treatment of the salt to afford the free base. Thus treatment of (—)-3-chloro-4-(3-*tert*-butylamino-2-hydroxypropoxy) - 1,2,5 - thiadiazole hydrogen O,O-di-p-toluoyl-(+)-tartrate, followed by extraction with diethyl ether, gave a free base that upon fractional crystallization from "Skellysolve B" to remove small amounts of racemic base affords 7 g. of (—)-3-chloro-4-(3-*tert*-butylamino-2-hydroxypropoxy) - 1,2,5 - thiadiazole, M.P. 59–60° C.

*Analysis.*—Calculated for $C_9H_{16}ClN_3O_2S$: C, 40.68; H, 6.07; Cl, 13.34; N, 15.81; S, 12.06. Found: C, 40.50; H, 6.21; Cl, 13.30; N, 16.00; S, 11.90.

Section 6

Isolation of (+)-3-chloro-4-(3-*tert*-butylamino-2-hydroxypropoxy)-1,2,5-thiadiazole Following the procedure of Section 3, the mother liquors and washings from the isolation of (—)-3-chloro-4-(3-*tert* - butylamino-2-hydroxypropoxy)-1,2,5-thiadiazole hydrogen, O,O-di-p-toluoyl-(+)-tartrate (from Step A, Section 5) are treated with alkali, the free organic base extracted with diethyl ether, and the ether removed to afford the free base enriched with (+)-3-chloro-4-(3-*tert*-butylamino-2-hydroxypropoxy)-1,2,5-thiadiazole. Careful fractional crystallization of this crude base from "Skellysolve B" removes (±)-3-chloro-4-(3-*tert*-butylamino-2-hydroxypropoxy)-1,2,5-thiadiazole, M.P. 78–9° C. The remaining fractions are combined and recrystallized to afford (+)-3-chloro-4-(3-*tert*-butylamino - 2 - hydroxypropoxy)-1,2,5-thiadiazole, M.P. 59–60° C.

Section 7

Isolation of (—)-3-chloro-4-(3-*tert*-butylamino-2-hydroxypropoxy)-1,2,5-thiadiazole The procedure set forth in Section 1 is repeated with the exception that O,O-di-p-toluoyl-(—)-tartaric acids replaced by (—)-tartaric acid. The resulting salt is recrystallized repeatedly from ethanol to give di-[(+)-3-chloro-4-(3-*tert*-butylamino-2-hydroxypropoxy)-1,2,5-thiadiazole]-(—)-tartrate, M.P. 130–2° C. $[\alpha]_D^{22°}$, —15.3° c.=2.6 in $CH_3OH$). The tartrate is converted by the method described in Step B of Section 1 to the free base and the base subjected to fractional crystallization to afford (+)-3-chloro-4-(3-*tert*-butylamino-2-hydroxypropoxy) - 1,2,5-thiadiazole. Work up of the washings and mother liquors from di-[(+)-3-chloro-4-(3-*tert*-butylamino-2 - hydroxypropoxy)-1,2,5-thiadiazole]-(—)-tartrate by the procedure given in Section 3 affords (—)-3-chloro-4-(3-*tert*-butylamino-2-hydroxypropoxy)-1,2,5-thiadiazole.

Section 8

Isolation of (+)-3-chloro-4-(3-*tert*-butylamino-2-hydroxypropoxy)-1,2,5-thiadiazole Step A: The procedure set forth in Section 1 is repeated with the exceptions that O,O-di-p-toluoyl-(—)-tartartic acid is replaced by (+)-tartaric acid. The resulting salt upon repeated recrystallization affords di-[(—)-3-chloro-4-(3-*tert*-butylamino-2-hydroxypropoxy) - 1,2,5 - thiadiazole]-(+)-tartrate, M.P. 130–2° C. ($[\alpha]_D^{22°}$ +15.6°, c.=2.3 in $CH_3OH$).

*Analysis.*—Calculated for $(C_9H_{16}ClN_3O_2S)_2 \cdot C_4H_6O_6$: C, 38.7; H, 6.51; Cl, 10.4; N, 12.3; S, 9.39. Found: C, 38.5; H, 5.70; Cl, 10.7; N, 12.2; S, 9.18.

Step B: The tartrate is converted by the procedure of Section 1, Step B, to the free base and the base recrystallized to afford (—)-3-chloro-4-(3-*tert*-butylamino-2-hydroxypropoxy)-1,2,5-thiadiazole, M.P. 58–60° C.

10

Step C: Work up of the mother liquors and washings from di-[(—)-3-chloro-4-(3-*tert*-butylamino-2 - hydroxypropoxy)-1,2,5-thiadiazole]-(+)-tartrate by the procedure described in Section 3 affords (+)-3-chloro-4-(3-*tert*-butylamino-2-hydroxypropoxyl)-1,2,5-thiadiazole.

Section 9

Isolation of (—) and (+)-3-chloro-4-(3-*tert*-butylamino-2-hydroxypropoxy)-1,2,5-thiadiazole via O,O-dibenzoyl-(+)-tartaric acid Step A: The procedure set forth in Section 1 is repeated with the exception that O,O-di-p-toluoyl-(—)-tartaric acid is replaced by O,O-dibenzoyl-(+)-tartaric acid. Thus, solutions of 5.3 g. (0.02 mole) of (±)-3-chloro-4-(3-*tert*-butylamino-2-hydroxypropoxy)-1,2,5-thiadiazole in 20 ml. of anhydrous ethanol and 7.5 g. (0.02 mole) of O,O-dibenzoyl-(+)-tartaric acid in 45 ml. of anhydrous ethanol are mixed and left two days at room temperature to give 1.7 g. of product, M.P. 177–8° C. ($[\alpha]_D^{20°}$ —42.9°, c.=1.55 in $CH_3OH$). Recrystallization of this material from anhydrous ethanol gave 1.35 g. of di-[(—)-3-chloro-4-(3-*tert*-butylamino-2-hydroxypropoxy) - 1,2,5 - thiadiazole]-O,O-dibenzoyl-(+)-tartrate, M.P. 177.7–178.2° C. (dec.). ($[\alpha]_D^{20°}$ —44.6°, c.=1.24 in $CH_3OH$).

Step B: The salt is partitioned between 50 ml. of diethyl ether and 50 ml. of water containing 1 g. of sodium carbonate, the layers are separated after vigorous shaking and the aqueous phase extracted four times with diethyl ether. The combined ethereal extracts are washed with water and evaporated to give the free base. This product is recrystallized from "Skellysolve B" to give 600 mg. of (—)-3-chloro-4-(3-*tert*-butylamino-2-hydroxypropoxy) - 1,2,5-thiadiazole, M.P. 59.5–60.5° C. ($[\alpha]_D^{20°}$ —7.16°, c.=3.5 in $CH_3OH$). Work up of the mother liquors from the dibenzoyl tartrate by the procedure of Section 3 affords (+)-3-chloro-4-(3-*tert*-butylamino-2-hydroxypropoxy) - 1,2,5-thiadiazole, M.P. 59–60° C.

Section 10

Isolation of (—) and (+)-3-chloro-4-(3-*tert*-butylamino-2-hydroxypropoxy)-1,2,5-thiadiazole via O,O-dibenzoyl-(+)-tartaric acid Similarly, following the procedure set forth in Section 1 with the exception that the O,O-di-p-toluoyl-(—)-tartaric acid is replaced with O,O-dibenzoyl-(+)-tartaric acid there is obtained specimens of (—)- and (+)-3-chloro-4-(3-*tert*-butylamino-2-hydroxypropoxy)-1,2,5-thiadiazole.

EXAMPLE 2

3-(4-methylpiperazinyl)-4-(3-tert-butylamino-2-hydroxypropoxy)-1,2,5-thiadiazole $\cdot 2HCl \cdot H_2O$ A mixture of 11.8 g. (39 millimoles) of 3-chloro-4-(3-*tert*-butylamino-2-hydroxypropoxy)-1,2,5-thiadiazole hydrochloride from Example 1, Step B, and 750 millimoles of N-methylpiperazine is heated and stirred at 125–135° C. for four hours. This mixture is refrigerated overnight and the precipitated product is collected and dried. The excess N-methylpiperazine is removed by distillation *in vacuo* and the residue is shaken with 10 ml. of water containing 1.6 g. of sodium hydroxide and extracted with diethyl ether. The combined ethereal extracts are washed sparingly with water and evaporated to dryness. The product is dissolved in anhydrous diethyl ether and treated with excess hydrogen chloride in diethyl ether to give crystalline product which after recrystallization from anhydrous acetone-diethyl ether gives 3-(4-methylpiperazinyl)-4-(3-*tert*-butylamino-2-hydroxypropoxy)-1,2,5 - thiadiazole $\cdot 2HCl \cdot H_2O$, M.P. 205° C.

*Analysis.*—Calculated for $C_{14}H_{27}N_5O_2S \cdot 2HCl \cdot H_2O$: C, 40.00; H, 7.43; Cl, 16.87; N, 16.75; S, 7.63. Found: C, 39.92; H, 7.36; Cl, 16.80; N, 16.65; S, 7.62.

Additional products of this invention that are prepared by the procedures described in Routes I, II and III and more particularly illustrated by Examples 1 and 2 are identified in the following table. The compounds identified in the table wherein R is a group having the structure $R^7R^8N-$ are advantageously prepared from the compound

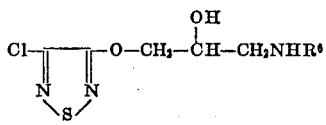

synthesized by the process substantially as described in Example 1 and then replacing the 3-chloro by the $R^7R^8N-$ group by reaction with the selected amine by substantially the same procedure described in Example 2.

TABLE

| R | $R^6$ |
|---|---|
| CH₃—N⌒NH N— | —CH(CH₃)—C₇H₁₅ |
| H—N⌒NH N— | —CH(CH₃)—CH₂—⟨phenyl⟩—OH |
| CH₃—N⌒NH N— | —CH₂CH₂—N⌒NH |
| CH₃—N⌒NH N— | —⟨phenyl⟩H |

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excipients include lactose, potato and maize starches, talc, gelatin, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

What is claimed is:

1. A 1,2,5-thiadiazole having the structure

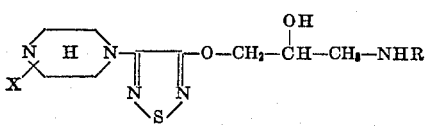

or a pharmacologically acceptable salt thereof wherein
X represents hydrogen or $C_{1-3}$ alkyl; and
$R^6$ represents $C_{1-10}$ alkyl, phenyl-$C_{1-3}$ alkyl, hydroxyphenyl-$C_{1-3}$ alkyl, piperazinyl-$C_{1-3}$ alkyl and $C_{3-6}$ cycloalkyl.

2. A 1,2,5-thiadiazole as claimed in claim 1 wherein X is attached to the 4-position nitrogen.

3. A 1,2,5-thiadiazole as claimed in claim 2 wherein X is methyl.

4. 3 - (4 - methylpiperazinyl) - 4 - (3 - *tert* - butylamino-2-hydroxypropoxy)-1,2,5-thiadiazole or a pharmacologically acceptable salt thereof.

References Cited

UNITED STATES PATENTS

| 3,330,832 | 12/1967 | English | 260—268 H |
| 3,391,150 | 7/1968 | Weinstock | 260—302 D |
| 2,975,187 | 3/1961 | Jansen | 260—268 H |
| 3,115,497 | 12/1963 | Vest | 260—302 |
| 3,655,663 | 4/1972 | Wasson | 260—268 H |
| 3,657,237 | 4/1972 | Weinstock et al. | 260—268 H |

OTHER REFERENCES

Wasson et al.: Chem Abstr, Vac. 72, Col 66947g abstracting German 1,925,956 (November 1969).

DONALD G. DAUS, Primary Examiner